(12) United States Patent
Moore et al.

(10) Patent No.: US 9,541,646 B2
(45) Date of Patent: Jan. 10, 2017

(54) APPARATUS FOR PULSE SHAPING

(71) Applicant: STMicroelectronics (Research & Development) Limited, Marlow (GB)

(72) Inventors: John Kevin Moore, Edinburgh (GB); Bruce Rae, Edinburgh (GB)

(73) Assignee: STMicroelectronics (Research & Development) Limited, Marlow (GB)

(*) Notice: Subject to any disclaimer, the term of this patent is extended or adjusted under 35 U.S.C. 154(b) by 349 days.

(21) Appl. No.: 14/181,857

(22) Filed: Feb. 17, 2014

(65) Prior Publication Data

US 2014/0231631 A1  Aug. 21, 2014

(30) Foreign Application Priority Data

Feb. 18, 2013 (GB) .................................. 1302789.1

(51) Int. Cl.
| | |
|---|---|
| *G01S 17/10* | (2006.01) |
| *G01B 11/14* | (2006.01) |
| *G01S 17/02* | (2006.01) |
| *G01S 17/36* | (2006.01) |
| *G01S 7/486* | (2006.01) |
| *G01S 7/497* | (2006.01) |

(52) U.S. Cl.
CPC .............. *G01S 17/10* (2013.01); *G01S 7/4865* (2013.01); *G01S 7/497* (2013.01); *G01S 17/026* (2013.01); *G01S 17/36* (2013.01)

(58) Field of Classification Search
CPC ........ G01S 17/10; G01S 17/026; G01S 17/36; G01S 7/497; G01S 7/4865; G01B 11/14
See application file for complete search history.

(56) References Cited

U.S. PATENT DOCUMENTS

| | | | | |
|---|---|---|---|---|
| 3,018,390 | A * | 1/1962 | Yourke | ..................... H03K 5/01 |
| | | | | 327/172 |
| 8,735,831 | B2 * | 5/2014 | Zhang | ................... G01T 1/1647 |
| | | | | 250/362 |
| 8,879,048 | B2 * | 11/2014 | Mellot | .................... G01S 17/36 |
| | | | | 356/3.01 |
| 9,052,356 | B2 * | 6/2015 | Chu | ...................... G01R 31/311 |
| 2006/0007422 | A1 * | 1/2006 | Dimsdale | .............. G01S 7/4865 |
| | | | | 356/5.04 |
| 2006/0202129 | A1 * | 9/2006 | Niclass | .................... G01T 1/248 |
| | | | | 250/370.14 |
| 2007/0182949 | A1 | 8/2007 | Niclass | |
| 2010/0182011 | A1 * | 7/2010 | Prescher | ................. G01T 1/248 |
| | | | | 324/501 |

(Continued)

FOREIGN PATENT DOCUMENTS

| | | |
|---|---|---|
| EP | 1944622 A1 | 7/2008 |
| EP | 2306165 A2 | 4/2011 |

(Continued)

OTHER PUBLICATIONS

UK-IPO Search Report for GB1302789.1 mailed May 30, 2013 (3 pages).

*Primary Examiner* — John Lee
(74) *Attorney, Agent, or Firm* — Gardere Wynne Sewell, LLP

(57) ABSTRACT

An array of photon sensitive devices is configured to provide outputs. Pulse shaping circuits operate to shape a respective output of the array in a normal mode of operation and shape a calibration signal in a calibration mode of operation.

27 Claims, 12 Drawing Sheets

(56) References Cited

U.S. PATENT DOCUMENTS

| | | | |
|---|---|---|---|
| 2010/0188504 A1* | 7/2010 | Dimsdale | G01C 11/06 348/142 |
| 2010/0314531 A1 | 12/2010 | Menge | |
| 2011/0127415 A1* | 6/2011 | Kanter | G01J 1/44 250/252.1 |
| 2012/0057059 A1* | 3/2012 | Eldesouki | H01L 27/14601 348/302 |
| 2012/0057152 A1* | 3/2012 | Eldesouki | G01J 1/46 356/226 |
| 2012/0153120 A1* | 6/2012 | Baxter | G01S 17/026 250/205 |
| 2012/0154187 A1* | 6/2012 | Dutton | H03M 7/165 341/118 |
| 2012/0194479 A1* | 8/2012 | Stark | G06F 3/0428 345/175 |
| 2012/0294625 A1* | 11/2012 | Dynes | H04L 7/0008 398/155 |
| 2012/0305786 A1* | 12/2012 | Dierickx | G01J 1/44 250/371 |
| 2013/0068928 A1* | 3/2013 | Eldesouki | G01J 1/46 250/206 |
| 2013/0077082 A1* | 3/2013 | Mellot | G01S 17/36 356/4.01 |
| 2014/0070867 A1 | 3/2014 | Dutton | |
| 2014/0183339 A1* | 7/2014 | Dolinsky | G01T 1/2018 250/208.2 |
| 2014/0184197 A1* | 7/2014 | Dolinsky | G01J 11/00 324/96 |
| 2014/0231630 A1* | 8/2014 | Rae | G01S 17/10 250/214.1 |
| 2014/0231631 A1* | 8/2014 | Moore | G01S 17/10 250/214.1 |
| 2015/0293021 A1* | 10/2015 | Finkelstein | G01N 21/6452 506/13 |

FOREIGN PATENT DOCUMENTS

| | | |
|---|---|---|
| GB | 2494663 A | 3/2013 |
| JP | 2009243996 A | 10/2009 |
| JP | 2011075337 A | 4/2011 |
| WO | WO-2009038737 A2 | 3/2009 |

\* cited by examiner

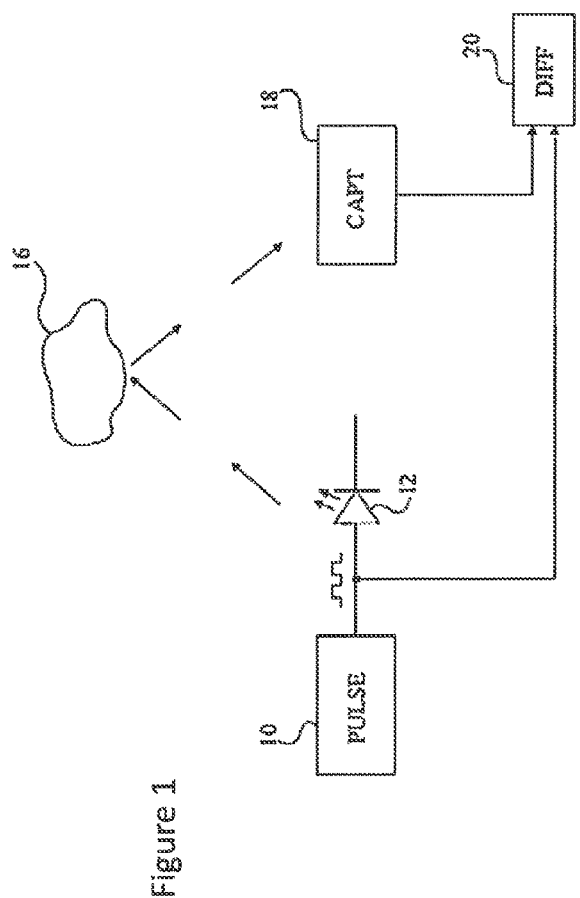
Figure 1
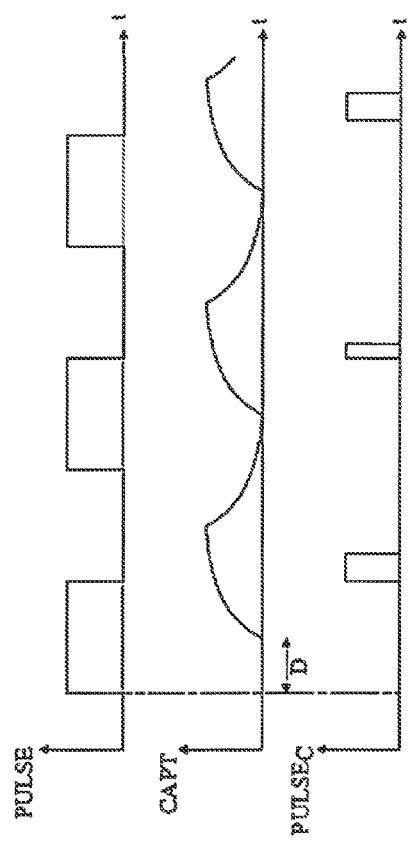
Figure 2A
Figure 2B
Figure 2C

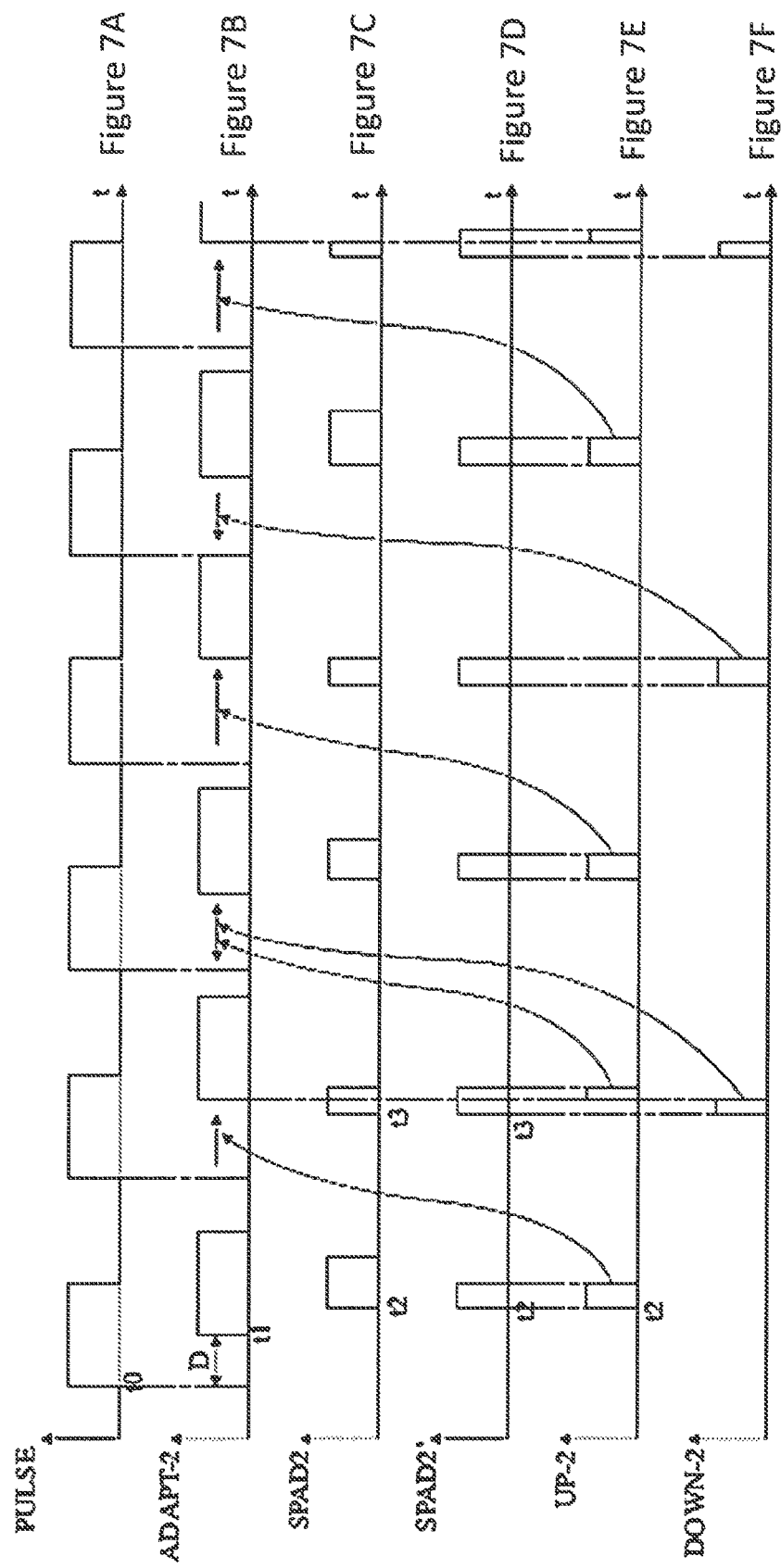

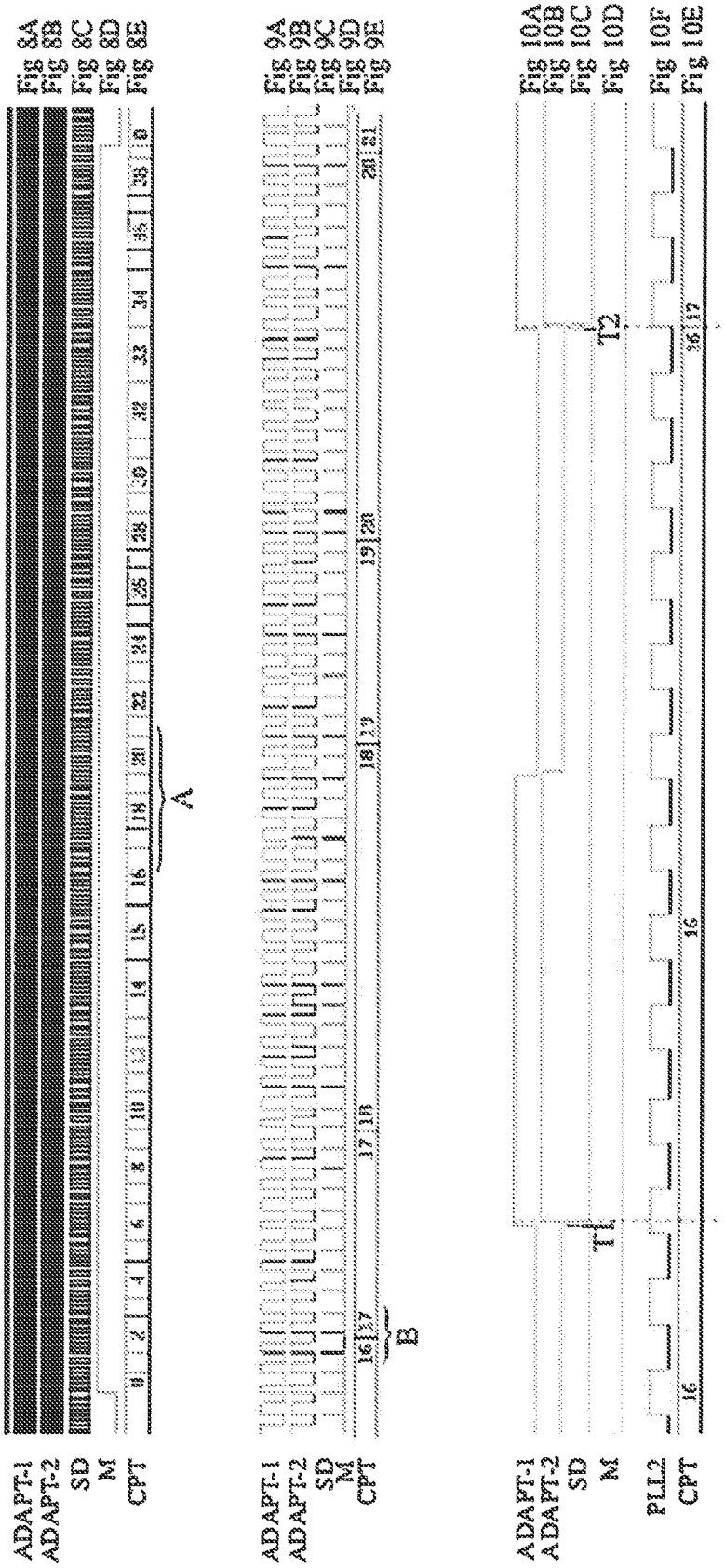

APPARATUS FOR PULSE SHAPING

PRIORITY CLAIM

This application for patent claims priority from Great Britain Application for Patent No. 1302789.1 filed Feb. 18, 2013, the disclosure of which is incorporated by reference.

TECHNICAL FIELD

Some embodiments relate to an apparatus and in particular, but not exclusively to, an apparatus with an array of photosensitive devices.

BACKGROUND

Devices for determining the distance to objects are known. One currently used method is called "Time of Flight". This method comprises sending a light signal towards the object and measuring the time taken by the signal to travel to the object and back. Generally, the calculation of the time taken by the signal for this travel is obtained by measuring the phase shift between the signal coming out of the light source and the signal reflected on the object and detected by a light sensor. Knowing this phase shift and the speed of light enables the determination of the distance to the object.

SUMMARY

According to an embodiment, there is provided an apparatus comprising an array of photon sensitive devices, said array configured to provide a plurality of outputs; and a plurality of pulse shaping circuitry, each pulse shaping circuitry configured to shape a respective output of said array in a normal mode of operation and a calibration signal in a calibration mode of operation.

BRIEF DESCRIPTION OF THE DRAWINGS

Some embodiments will now be described by way of example only and with reference to the accompanying Figures in which:

FIG. 1 illustrates principle of the "time of flight" method for determining the distance to an object;

FIGS. 2A to 2C are timing diagrams illustrating results obtained by means of the device of FIG. 1, as well the operation of "SPADs";

FIGS. 7A to 7F are timing diagrams illustrating the operation of the arrangement of FIG. 4;

FIGS. 8A to 8E, 9A to 9E, and 10A to 10F are timing diagrams illustrating the operation of the device of shown in FIG. 11;

DETAILED DESCRIPTION OF THE DRAWINGS

Figure 3:
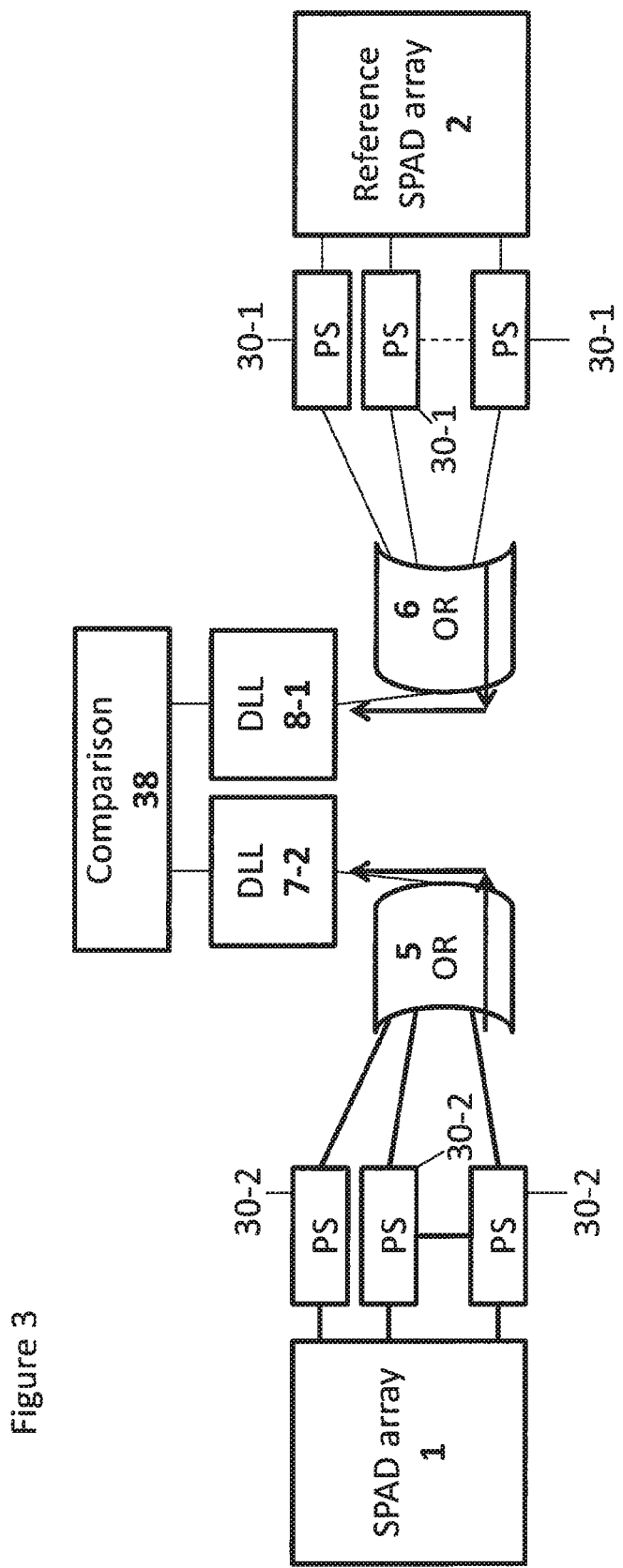
FIG. 3 shows a block diagram of an embodiment.

In FIG. 1, a generator 10 (PULSE) provides a periodic electric signal, for example, square-shaped. This signal powers a light source 12. An example of a light source 12 may be a light-emitting diode, or any known lighting device, for example, a laser. The signal coming out of light source 12 is transmitted towards an object 16 and is reflected by this object. The reflected light signal is detected by a light sensor 18, CAPT. The signal on sensor 18, CAPT, is thus phase-shifted from the signal provided by the generator by a time period proportional to twice the distance to object 16.

Calculation block 20 ("DIFF") receive the signals generated by generator 10 and by sensor 18 and calculate the phase shift between these signals to obtain the distance to object 16.

FIGS. 2A to 2C are timing diagrams illustrating the operation of a circuit such as that in FIG. 1. FIG. 2A illustrates a periodic signal "PULSE" capable of being provided by the generator 10 of FIG. 1. FIG. 2B illustrates the signal received by sensor 18, CAPT. Due to interactions with the outside and to the components forming sensor 18, the signal received by this sensor has, in this example, variations in the form of capacitor charges and discharges. The signal on sensor 18 is phase-shifted from the signal coming out of generator 10 by a delay D.

Usually, sensor 18 integrates one or several photo detection elements enabling the detection of the signal received after reflection on the object 16. Such elements may be rapid charge transfer photodiodes. Single-photon avalanche diodes, or "SPADs", also called Geiger mode avalanche photodiodes, may also be used. These devices have a reverse biased p-n junction in which a photo-generated carrier can trigger an avalanche current due to an impact ionization mechanism. SPADs may be designed to operate with a reverse bias voltage well above the breakdown voltage.

FIG. 2C illustrates the signal (PULSEC) generated by sensor 18, in the case where this sensor contains such a SPAD.

SPADs operate as follows. At an initial time, the diode is biased to a voltage larger than its breakdown voltage. The reception of a photon in the diode junction area starts an avalanche in the diode, which creates an electric pulse. The diode is then biased back to a voltage smaller than the breakdown voltage, so that the SPAD reacts again to the reception of a photon. SPADs can currently be used in cycles having reactivation periods shorter than 10 ns. Thereby, SPADs can be used at high frequency to detect objects at relatively short distances from the measurement device, for example, distances ranging from a few centimeters to a few tens of centimeters.

As illustrated in FIG. 2C, if SPADs receive a light signal such as described in relation to FIG. 2B, the diode avalanche time may vary with respect to this signal. The graph of the number of pulses versus time reflects the power-time profile of the light received by the SPAD. Thus, in the case illustrated in FIGS. 2A to 2C, on a large number of acquisitions, the graph of the pulse transmission by the SPAD substantially follows the curve of FIG. 2B.

To obtain information relative to the distance to an object, a circuit and a method using data obtained from a device will now be described.

Reference is now made to FIG. 3 which schematically shows an overview of an embodiment. The arrangement comprises a first SPAD array 1 and a reference SPAD array 2. Each SPAD array comprises a plurality of SPAD devices.

The SPAD array 1 provides a plurality of outputs. By way of example, each SPAD of the array may provide an output. The respective outputs of the first SPAD array 1 are provided to respective circuitry 30-2 which are arranged to shape the output of the respective SPAD. This circuitry will be referred to as pulse shaping circuitry. Each output may thus have its own pulse shaping circuitry.

Likewise, the respective row outputs of the reference SPAD array 2 are provided to respective pulse shaping circuitry 30-1. The outputs of each of the pulse shaping circuitry 30-2 associated with the first SPAD array 1 are input to an OR tree 5. Likewise, the output of each of the pulse shaping circuitry 30-1 associated with the reference SPAD array 2 are provided to a second OR tree 6. The output of the first OR tree 5 is provided to a delay lock loop DLL 8-2 while the output of the second OR tree 6 is provided to a second DLL 8-1.

The outputs of the two DLLs are compared by a comparator arrangement 38 to determine a distance of an object, as will be described in more detail later.

In this example a pulse shaping circuitry is provided for each SPAD of the respective arrays but in other embodiments, a different relationship between the pulse shaping circuitry and output of the array may be supported.

Some embodiments may obtain ranging information based on the average phase shift between signals provided by two SPADs or SPAD arrays (one a reference SPAD and the other a measurement SPAD). This will be described in more detail later. This may for example be used in ranging applications in which the distance of an object from the device is determined.

Some embodiments may be integrated in a device enabling the accurate determination of the phase shift between signals.

Figure 4:
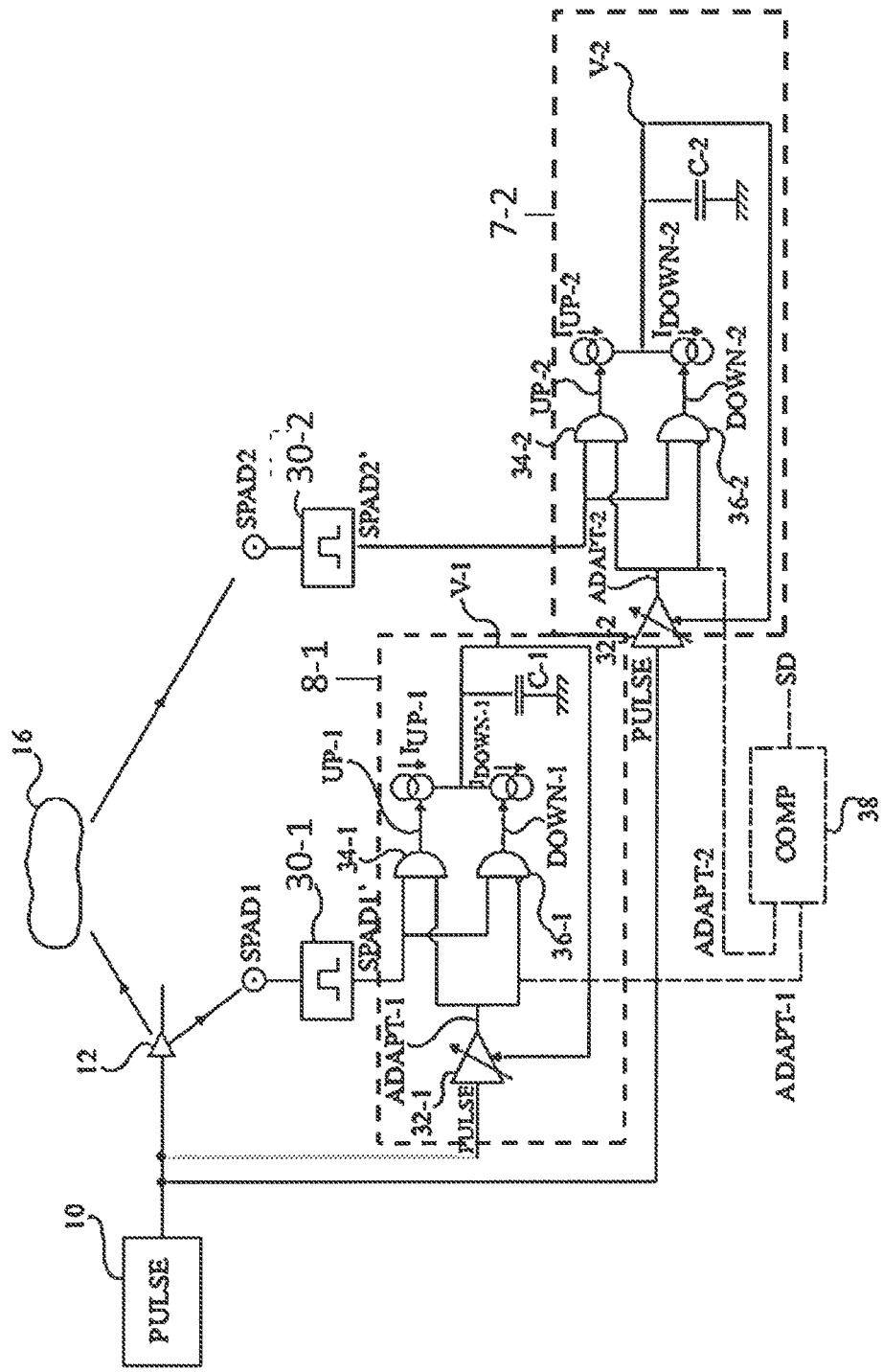
FIG. 4 illustrates part of the embodiment of FIG. 3 in more detail.

FIG. 4 shows in more detail some of the circuitry which may be associated with the arrangement of FIG. 3. FIG. 4 illustrates shows a single SPAD, SPAD 2 of the first SPAD array 1 and a single SPAD, SPAD 1 of the reference array 2, for simplicity. It should be appreciated that the OR trees of FIG. 3 are not shown.

The device comprises an electric generator 10 ("PULSE") having a periodic square output powering a light source 12. The first single-photon avalanche diode, SPAD1, of the reference array is placed very close to light source 12 and thus may almost instantaneously receive the signal transmitted by light source 12.

A second single-photon avalanche diode, SPAD2, is placed to receive the light signal emitted by source, 12, after reflection on an object 16. A mask system between the two diodes may for example be used so that diode SPAD2 does not receive the light directly emitted by light source 12. SPAD1 is triggered predominantly by light reflected inside the device.

The use of sensor SPAD1 very close to light source 12 provides improved reference information with respect to the reference information directly provided by generator 10. Indeed, since the signal coming out of sensor SPAD1 is of the same type as that coming out of sensor SPAD2, other conditions, such as the ambient light, may have the same influence on both signals. The comparison between these signals may thus more reliable than the comparison between the signal output by sensor SPAD2 and the signal output by generator 10. However it should be appreciated that in some embodiments, the reference SPAD may be omitted.

The diodes SPAD1 and SPAD2 generate pulses on reception of the light beams that they receive. In the following description, since the circuits associated with diodes SPAD1 and SPAD2 are the same, an extension "-1" will be used to designate circuit elements associated with diode SPAD1, and an extension "-2" will be used to designate elements associated with diode SPAD2.

The electronic circuit associated with the signal generated by diode SPAD1 will now be described, the circuit associated with diode SPAD2 being the same.

The signal emitted by diode SPAD1 crosses a pulse shaping circuit 30-1 enabling the reshaping of the pulses generated by diode SPAD1. More specifically, circuit 30-1 delivers a signal SPAD1' exhibiting pulses having their beginning coinciding with the beginning of pulses of the signal SPAD1, but of constant duration.

The signal coming out of generator 10 ("PULSE") is coupled to the input of the DLL 8-1 and in particular to the input of a phase shifter circuit 32-1 of variable phase shift, having its value varying according to a voltage V-1 applied thereto as a control. The output of phase shifter 32-1, called ADAPT-1, is thus phase-shifted with respect to the signal generated by the generator 10 and is the output of the DLL 8-1. An AND gate, 34-1, receives the signal SPAD1' and the signal ADAPT-1 on its two non-inverting inputs. A second AND gate, 36-1, receives the signal SPAD1' on a first non-inverting input and the signal ADAPT-1 on a second inverting input. The output of gate 34-1 is called UP-1 and the output of gate 36-1 is called DOWN-1. The signals UP-1 and DOWN-1 respectively control the activation of current sources IUP-1 and IDOWN-1, which are respectively placed between a power supply source (not shown) and a second terminal of a capacitor C-1 and the first terminal of capacitor C-1 and the ground. Capacitor C-1 is placed between the junction point of the current sources and ground. The voltage across capacitor C-1 corresponds to the signal V-1 for controlling phase shifter 32-1 of variable phase shift. This circuitry is the DLL 8-1

The signal ADAPT-1 of the circuit associated with diode SPAD1 and the signal ADAPT-2 of the circuit associated with diode SPAD2 are coupled to the input of a comparison system 38 (COMP) which provides a signal SD which is dependent on the phase shift between the signals ADAPT-1 and ADAPT-2.

Figure 5:
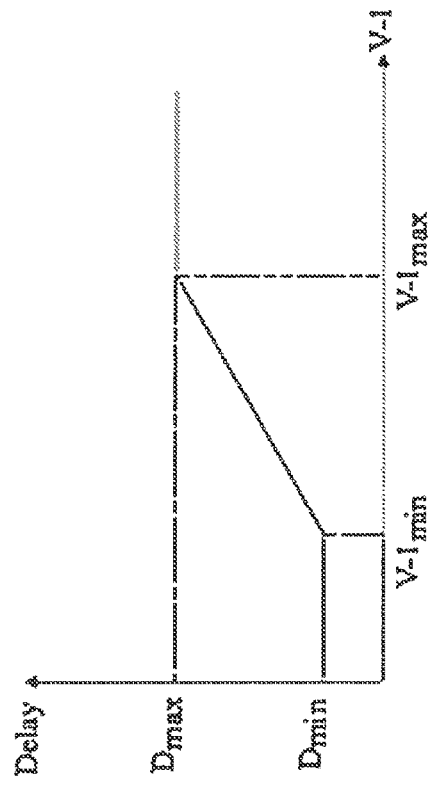
FIGS. 5 and 6 illustrate the operation of the arrangement of FIG. 4 in more detail.

FIG. 5 is a graph illustrating the operation of phase shifter 32-1. This curve illustrates the phase shift signal DELAY between the output signal ADAPT-1 and the input signal PULSE, according to the value of a control voltage V-1. As illustrated in this graph, the phase shift is constant and equal to a duration Dmin for a voltage V-1 smaller than a voltage V-1min and equal to a value Dmax when the voltage V-1 is greater than a voltage V-1max. Between voltages V-1min and V-1max, the phase shift signal DELAY is linear with a positive slope between values Dmin and Dmax. As an example, a minimum phase shift Dmin may be equal to zero and a maximum phase shift Dmax may be equal to a period of the output signal of generator 10. Other configurations may be used, for example, if it is known that the distance to the object to be detected implies a delay ranging between predetermined values.

Figure 6:
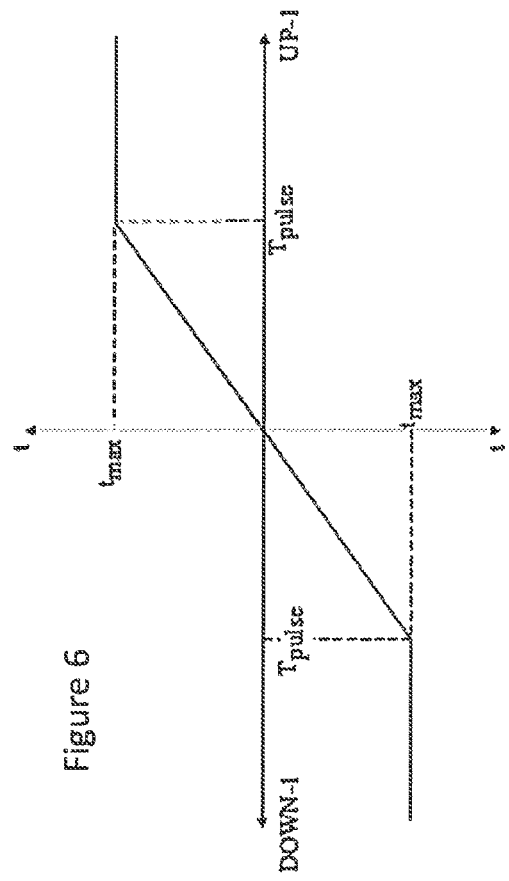

FIG. 6 is a graph illustrating the operation of the system comprising current sources IUP-1 and IDOWN-1, controlled by the signals UP-1 and DOWN-1. The graph of FIG. 6 illustrates the activation time of current sources IUP-1 and IDOWN-1 according to the duration of the signals UP-1 and DOWN-1. A threshold value TPULSE defines a minimum time limit for which the duration of the signals UP-1 and DOWN-1 has no influence. The aim is, when current source IUP-1 is activated, for capacitor C-1 to charge, which increases voltage V-1 and, when current source IDOWN-1 is activated, for capacitor C-1 to discharge, which decreases voltage V-1.

When the time in the high state of the signal UP-1 exceeds duration TPULSE, the current source IUP-1 is activated for a predetermined duration tmax. When the signal DOWN-1 is in a high state for a duration greater than a duration TPULSE, the current source IDOWN-1 is activated for the duration tmax, and capacitor C-1 discharges by a predetermined value. If the duration of the control signals UP-1 and DOWN-1 is shorter than the duration of TPULSE, the activation duration of sources IUP-1 and IDOWN-1 is proportional to this duration. Thus, during a cycle, if the signal UP-1 and the signal DOWN-1 are alternately in the high state, the amount of current injected into capacitor C-1 may be zero.

FIGS. 7A to 7F are timing diagrams illustrating the operation of the device of FIGS. 3 and 4, for the diode SPAD2. More specifically, FIG. 7A illustrates the signal PULSE at the output of generator 10 or of light source 12, FIG. 7B illustrates the signal ADAPT-2, FIG. 7C illustrates the signal transmitted by diode SPAD2, FIG. 7D illustrates the signal SPAD2', FIG. 7E illustrates the signal UP-2, and FIG. 7F illustrates the signal DOWN-2.

At a time t0, the signal PULSE switches from a low state to a high state. An arbitrary initial delay between the signal PULSE and the signal ADAPT-2 by one quarter of a period (D) is here considered. It should be noted that the initial delay of the signal ADAPT-2 may be zero, randomly generated, or set to a predetermined value.

At a time t1, shifted by a duration D from time t0, the signal ADAPT-2 switches to the high state. At a time t2, the diode SPAD2 generates a pulse associated with the reception of a light photon reflected by the object. The signal SPAD2 is reshaped by circuit 30-2 to obtain a signal SPAD2' starting at time t2 but having a same duration over the different periods.

While the signal SPAD2' is in the high state, the signal ADAPT-2 also is in the high state, which causes a switching of the signal UP-2 to the high state for the duration of the pulse of the signal SPAD2'. As illustrated by an arrow, the switching to the high state of the signal UP-2 increases the phase shift between the signal PULSE and the signal ADAPT-2 at the next period.

During the next cycle, diode SPAD2 emits a pulse at a time t3. In the shown example, a first half of the pulse reshaped by circuit 30-2 (SPAD2') occurs while the signal ADAPT-2 is the low state, and the second half of the pulse occurs while the signal ADAPT-2 is in the high state. This causes the successive switching to the high state of the signal DOWN-2 and of the signal UP-2. Current sources IUP-2 and IDOWN-2 are thus alternately activated. Since the current injections of these two sources mutually cancel, the phase shift between the signals PULSE and ADAPT-2 does not vary during the third period.

As illustrated in the timing diagrams of FIGS. 7A to 7F, the method described here above carries on for a large number of cycles. The adjustment of the phase shift between the signals ADAPT-2 and PULSE is performed by stages of low amplitude, which may minimize the influence of pulses which would occur far from the point of maximum power reception by diode SPAD2.

The circuit of FIG. 4 thus may obtain, after a large number of adjustment cycles, a the signal ADAPT-1 which is phase-shifted from the signal PULSE and having the beginning of a period coinciding with the average time of occurrence of the pulses on diode SPAD1 and a signal ADAPT-2 which is phase-shifted from the signal PULSE and having the beginning of a period coinciding with the average time of occurrence of the pulses on diode SPAD2. "ADLL" (Analog Delay Locked Loop) will be used hereinafter to designate a loop formed of a phase shifter 32, of gates 34 and 36, of current sources IUP and DOWN, and of a capacitor C, providing the signal ADAPT.

Advantageously, the use of two ADLLs may avoid a phase shift that may occur between the signal of generator 10 and the signal of sensor SPAD2 due to delays inherent with driving the light source. Further, the obtaining of the signals ADAPT-1 and ADAPT-2 after a large number of adaptation cycles may limit the device sensitivity to the waveform of the light emitted by the generator.

The method provided herein provides two phases for each distance determination. A first phase comprises obtaining periodic phase-shifted signals ADAPT-1 and ADAPT-2, as described here above by means of the two ADLLs. As an example, the adjustment may be performed over a number of cycles varying between 100,000 and 10 million. In some embodiments, if the aim is to obtain a proper adjustment within a delay ranging between 1 and 10 ms, the adjustment may be performed over approximately one million cycles, if the signal PULSE has a period of the order of one nanosecond. A second phase comprises blocking the phase adjustment and working on the signals ADAPT-1 and ADAPT-2 having a phase shift which no longer varies, and determining the duration of this phase shift.

However, the measurement of this phase shift is not immediate. Indeed, due to the short distances which are desired to be detected, this phase shift may be very small. It may be necessary to provide a device providing distance information based on the signals ADAPT-1 and ADAPT-2.

Many variations of the device and of the method described here above may be provided. A step prior to the phase shift adjustment may be provided, during which the voltage across capacitors C-1 and C-2 is initialized to a predetermined value, for example, half its maximum value. This may enable a faster adjustment towards appropriate phase shifts of the signals ADAPT-1 and ADAPT-2. It may also be provided to set the voltage across capacitors C-1 and C-2 to a different value if information relative to the distance is known. For example, the initial adjustment of the voltage across the capacitors may be performed by means of a comparator receiving the signal ADAPT-1 or ADAPT-2 on an input and a reference voltage on another input, the output of this comparator activating current sources IUP-1, IUP-2, IDOWN-1 or IDOWN-2.

A step preceding the phase shift adjustment may also be provided, during which a phase shift in the idle state, that is, with no light wave reception, is measured between voltage ADAPT-1 and ADAPT-2. This phase shift will then be subtracted from the measurements if necessary.

Figure 11:
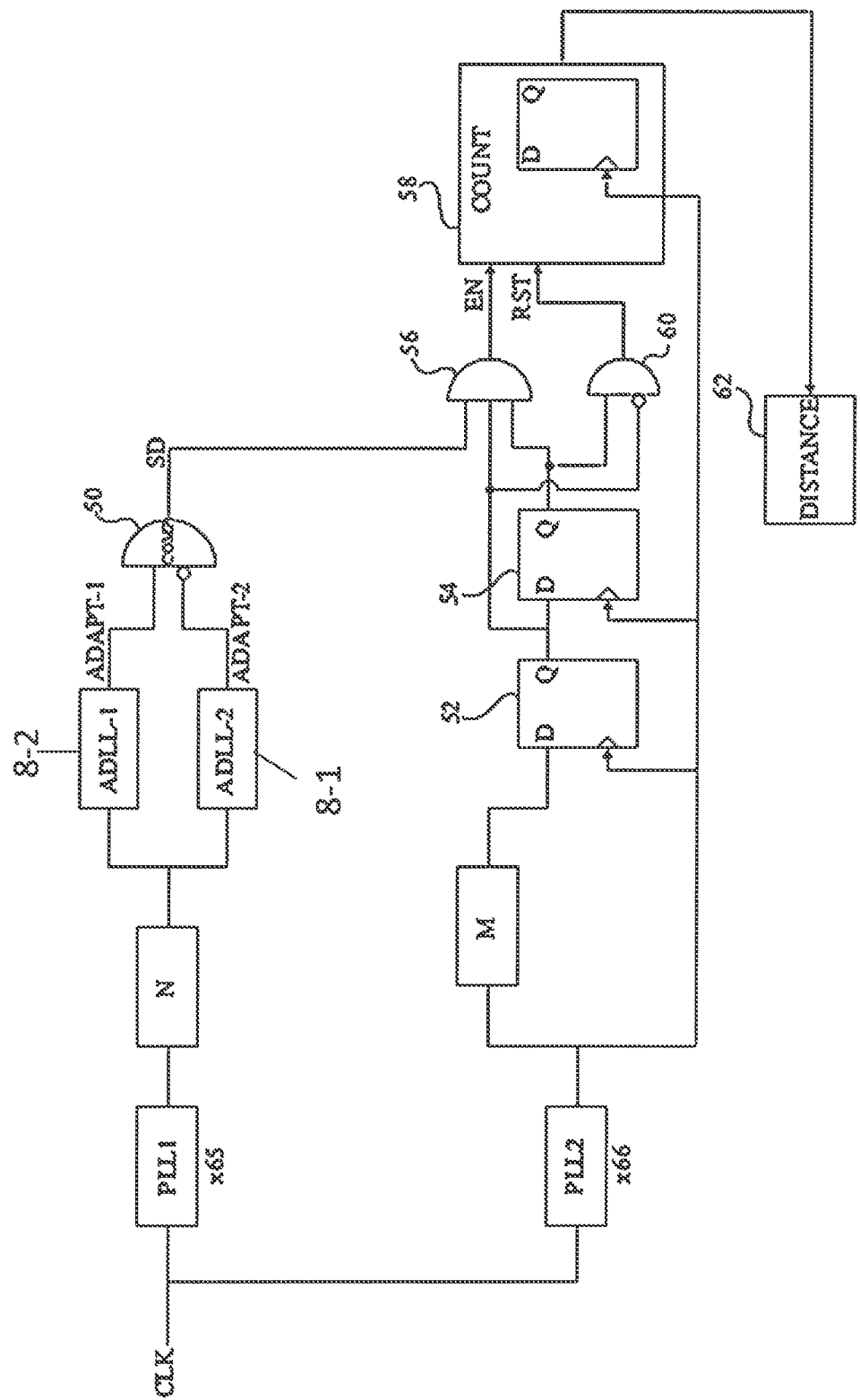
FIG. 11 illustrates a device for calculating the distance to an object based on the signals obtained from the arrangement of FIG. 4.

FIG. 11 illustrates a device showing using one method to for determining of the duration of the phase shift between the signals ADAPT-1 and ADAPT-2, and thus the distance to object 16. The circuit of FIG. 11 schematically shows the elements of the circuit of FIG. 4: two blocks ADLL-1 and ADLL-2 correspond to the blocks 8-1 and 8-2 respectively.

The circuit of FIG. 11 comprises a main input receiving a clock signal CLK. A first branch of the circuit, receiving clock signal CLK as an input, comprises a first phase-locked loop PLL1 and a circuit for dividing the frequency by a factor N. Phase-locked loop PLL1 increases the frequency of the output signal by a factor nPLL1, and the dividing circuit divides this frequency to obtain a frequency lower than the maximum avalanche triggering frequency of diodes SPAD.

The output signal of divider N corresponds to the signal PULSE of the circuit of FIG. 4 for circuits ADLL1 and ADLL2. The signals ADAPT-1 and ADAPT-2, once adjusted and set, are coupled to the input of an AND gate 50 (COMP), the signal ADAPT-1 being coupled to a non-inverting input and the signal ADAPT-2 to an inverting input. The signal SD at the output of gate 50 thus is in the high state during each period for a duration corresponding to the (set) phase shift between the signals ADAPT-1 and ADAPT-2.

To obtain information relative to the duration in the high state of the signal SD, a counter provides, after counting, a number which is an image of this duration.

This counter operates over several consecutive periods of the signal SD. To form this counter, clock input CLK is coupled to the input of a second phase-locked loop PLL2 having a frequency multiplication coefficient, nPLL2, which is different from but which may be close to multiplication coefficient nPLL1 of phase-locked loop PLL1. As an example, if clock signal CLK has a frequency on the order of a few MHz, phase-locked loops PLL1 and PLL2 may have multiplication coefficients such as 65 and 66. Other values may of course be used.

The output signal of phase-locked loop PLL2 is coupled to a frequency dividing circuit of coefficient M, the output signal of divider M defining the period during which the counter operates before a reset. The counting period should be sufficient to obtain reliable information at the counter output. The counting period should correspond at least to the lowest common multiple between the periods of the output signals of loop PLL1 and of loop PLL2.

The output of phase-locked loop PLL2 is coupled to the control input (on the rising edge) of two D flip-flops, 52 and 54. The output of divider M is coupled to the main input of a first D flip-flop 52, the Q output of flip-flop 52 being coupled to the main input of flip-flop 54.

A three-input AND gate 56 receives, on its inputs signal SD, the output of flip-flop 52, and the output of flip-flop 54. The output of gate 56 forms the activation signal of a counter COUNT 58. Counter 58 is synchronized on the rising edges of the output signal of the phase-locked loop PLL2. A two-input AND gate 60 receives the output of the flip-flop 54 on a non-inverting input and the output of flip-flop 52 on an inverting input, the output of gate 60 forming a signal for resetting (RST) the counter 58.

Counter 58 operates as follows. On each rising edge of the output signal of phase-locked loop PLL2, if the output of gate 56 is in the high state, that is, if the signal SD is in the high state and that one is in a counting phase (output signal of divider M in the high state), the counter increments. Due to the frequency difference of the output signals of phase-locked loops PLL1 and PLL2, the counter only increments a small number of times in a counting cycle, as will be seen in the timing diagrams of FIGS. 8A to 8E, 9A to 9E, and 10A to 10F. The number stored at the end of a counting cycle of the counter can be associated with a duration in the high state of the signal SD, and thus with a distance to the object.

FIGS. 8A to 8E, 9A to 9E, and 10A to 10F are timing diagrams illustrating the operation of the device of FIG. 11.

More specifically, the timing diagrams of FIGS. 8A to 8E illustrate a full counting cycle, FIGS. 9A to 9E are an enlargement of FIGS. 8A to 8E (portion A) over a few increments of counter 58, and FIGS. 10A to 10F illustrate the detail of an incrementing of counter 58 (portion B of FIGS. 9A to 9E).

The timing diagrams of FIGS. 8A to 8E, of FIGS. 9A to 9E, and of FIGS. 10A to 10E respectively illustrate the signal ADAPT-1, the signal ADAPT-2, the signal SD, the output signal of divider M, and the output of counter 58. The timing diagram of FIG. 10F further illustrates the output signal of loop PLL2.

As can be seen in these different timing diagrams, the counter is reset after M periods of the output signal of loop PLL2. The enlargements of FIGS. 10A to 10F show two pulses on the signal SD, one implying an increment of the counter, the other implying none.

At a time T1, a pulse on the signal SD appears, but no rising edge of the output signal of phase-locked loop PLL2 occurs during this pulse, which does not modify the counter state. At a time T2, a second pulse on the signal SD appears, and a rising edge of the output signal of phase-locked loop PLL2 occurs during this pulse, which increments the counter.

Due to the frequency difference between the output signals of loops PLL1 and PLL2, the rising edges of the output signal of loop PLL2, over a counting duration, occur at different times of the period of the signal SD. Thus, on a counting cycle, the longer the duration of the pulse on the signal SD, the more the counter increments. The value on counter 58 at the end of each counting cycle thus provides, by means of a block 62 (DISTANCE) for reading the value on the counter at the end of the cycle, a very accurate value of the distance to the object. The device of FIG. 11 may obtain very fine time accuracy by using clock signals at reasonable frequencies for an integrated circuit implementation, for example smaller than 1 GHz.

It should be noted that several counting cycles may be provided for a same distance to the object, with the possibility of then calculating an average to determine a more accurate possible distance to the object.

In some embodiments, the signal SD may be shifted by a few periods of the output signal of block PLL1, with respect to the beginning of a period of the output signal of divider N, to make sure that all switching to the high state of the signal SD are effectively counted by the counter. The duration of the pulses on the signal SD may also be artificially increased for a better reading of the on-state duration of this signal, the value stored on the counter at the end of the counting cycle being accordingly adapted.

Specific embodiments have been described. Various alterations, modifications, and improvements will readily occur to those skilled in the art. In particular, embodiments are not limited to an association of ADLLs coupled to SPADs and to a system for determining the on-state duration such as that in FIG. 11.

Indeed, the above-described ADLLs (FIG. 4) may for example be coupled to other types of light sensors than SPADs, where the signals originating from these sensors are in the form of events occurring with the reception of light pulses. For example, rapid charge transfer photodiodes, which alternately transfer the photo generated charges onto two read nodes during a cycle, may be used. The amount of charges on each node in each cycle provides information relative to the distance to the object.

In the case of such diodes, the signal exhibiting detectable events considered to implement the method described herein will originate from the signal on each of the read nodes, the time of occurrence of said events being associated with the amount of light on each node. Circuitry configured to generate these events from the signal on the two read nodes may be provided.

In some embodiments, to determine the duration of a signal which is an image of the phase shift between two signals output by ADLLs, other devices than that described in relation with FIG. 11 may be used.

It should be appreciated that in some embodiments, different types of DLL may be used.

In some embodiments, the DLL s may be omitted and optionally replaced by any other suitable circuitry.

As shown in FIG. 3, an OR tree is provided for each array. The OR tree function is to allow the outputs of the respective phase shaper to be output in turn to the respective DLL. The OR tree can be regarded as functionally equivalent to a single OR gate with a separate input from each of the pulse shaping circuitry. With this arrangement, the same DLL circuitry may be used by two or more or all of the pulse shaping circuitry. In some embodiments, separate DLL circuitry may be provided for each pulse shaper. It should be appreciated that the outputs of the reference array and the measuring array may be controlled so that there is correspondence between the corresponding outputs of the measuring array 1 and the reference array 2. In other words, each SPAD of the measuring array may have a respective counterpart in the reference array.

The pulses output from the SPAD array may be greater than 10 ns in length in some embodiments. The longer the period or length of pulses entering the input of the OR tree, the more likely it is for two or more SPAD outputs to be high together. One SPAD array output being high has the same effect at the output as two or more SPAD array outputs being high. In both cases the output of the OR tree sits high. Accordingly, timing information can be lost as output pulses increase in length. This effect is sometimes referred to as pile up. The pulse shaping circuitry is used to shorten the pulse length and reduce the effect of pileup for a given SPAD count rate.

Process variations mean that a given pulse shaper and route through the OR tree may have a different width or delay to other pulse shaping circuitry and routes through the OR tree. While this mismatch can be minimized by design, three standard deviations of mismatch could still account for around 60 picoseconds of pulse width mismatch even after optimization of design. This may be a significant factor in some uses of the SPAD array. Consider for example a short range ranging system operating for example down to a 1 cm target distance. 1 cm is equivalent to a 66.6 picosecond time difference between light arriving on the two SPAD arrays of FIG. 3.

Figure 12:
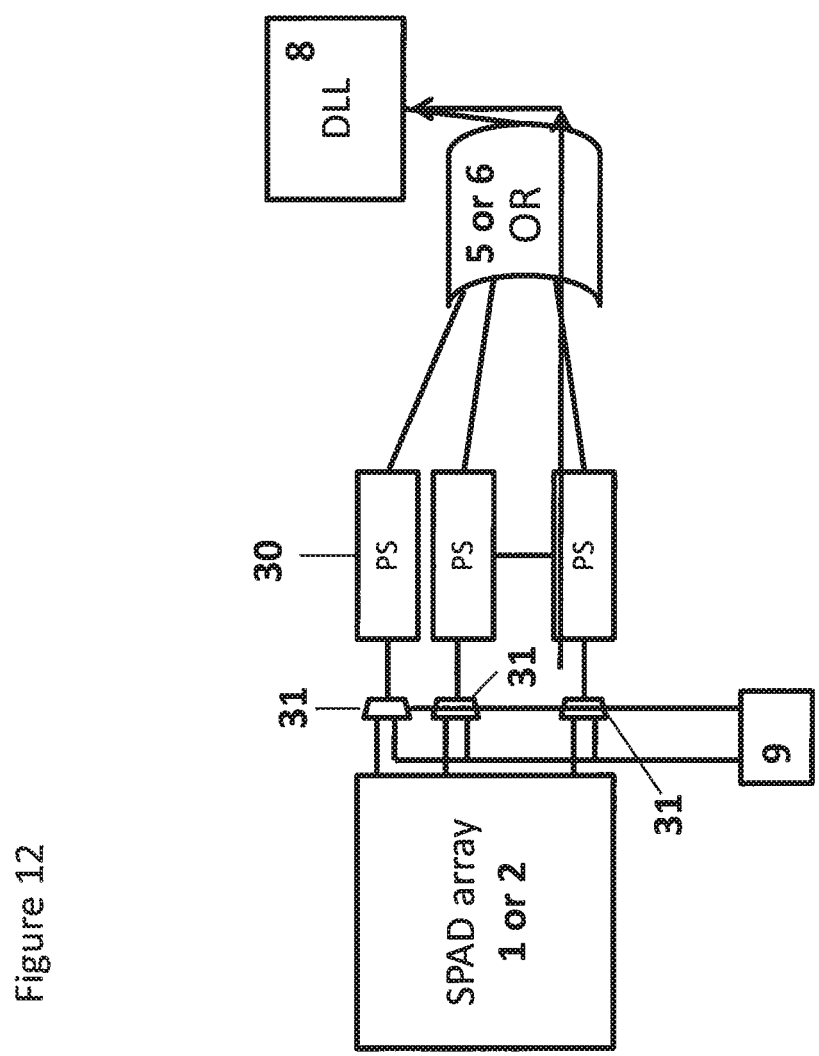
FIG. 12 shows a calibration arrangement for some embodiments.

In some embodiments, the arrangement may be calibrated. FIG. 12 should schematically shows how calibration may be achieved in some embodiments. It should be appreciated that in some embodiments differences in logical and path delays between the reference and return arrays will be calibrated. The same arrangement shown in FIG. 12 can be used for both of the arrays but for simplicity the arrangement with respect to only one array is shown. The arrangement of FIG. 12 differs from that of FIG. 3 in that a multiplexer 31 is provided between the output of the array and the corresponding input of the respective pulse shaper 30. Each multiplexer 31 receives two input signals. One input signal is from the respective output of the SPAD array and the other input signal is from a controller 9 which provides a calibration output signal. Each of the multiplexers 31 is controlled by a calibration control signal provided by the controller 9. It should be appreciated that the controller 9 will provide the same control signal and calibration signal to both the multiplexers associated with the measurement array 1 and the multiplexers associated with the reference array 2, at the same time.

The controller 9, in a calibration mode, is configured to control each of the multiplexers in turn to output the calibration signal which is provided at its respective input by the controller. The calibration signal will then propagate through the respective pulse shaping circuitry, OR tree (5 or 6 depending on which array the OR tree is associated) and the DLL circuitry 8. Thus, the calibration pulse passes through exactly the same pulse shaper and OR tree that would be used during normal operation. The calibration pulses are thus time interleaved to pass through different pulse shaping circuitry at different times. This is to assist in removing fixed delay discrepancies from the final system range measurement.

In the normal mode of operation, the controller 9 is configured to control the multiplexers such that the outputs of SPAD array are provided as the output of the respective multiplexer, again in a time interleaved manner.

Figure 13:
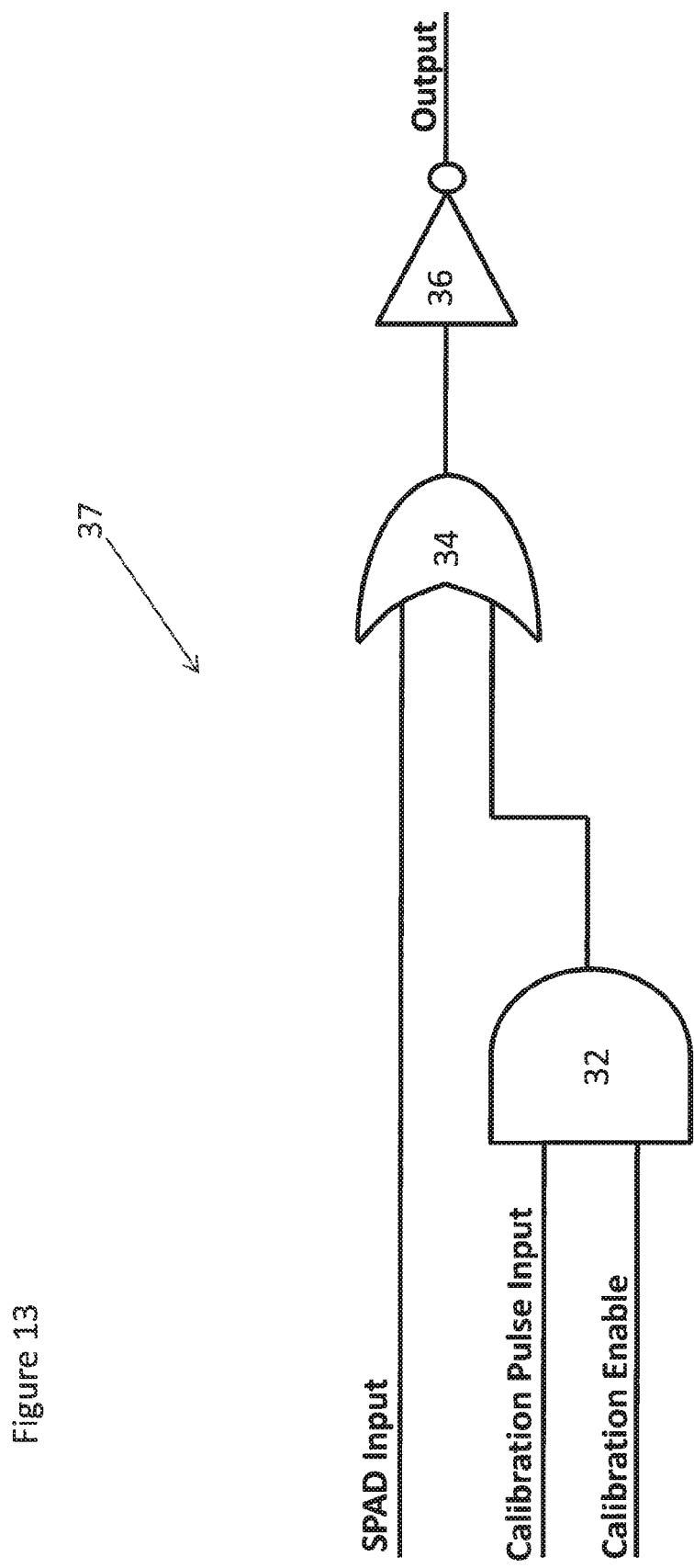
FIG. 13 shows an alternative selection logic arrangement for use in the arrangement of FIG. 12, FIG. 14, shows schematically a calibration pulse decoder for use with the arrangement of FIG. 12.

Reference is made to FIG. 13 which shows a different selection logic arrangement 37 to the selection logic arrangement of FIG. 12 with the respective multiplexors. One of the arrangements shown in FIG. 13 would be used instead of a respective multiplexer.

The arrangement of FIG. 13 comprises an AND gate 32. The AND gate 32 receives a first input and a second input. The first input is a calibration signal or pulse and the second input is a calibration enable signal. The output of the AND gate 32 is provided as an input to an OR gate 34 along with an output from a respective SPAD. The output of the OR gate 34 is provided to an inverter 36. The output of that inverter 36 is provided to a respective pulse shaping circuitry 30.

In some embodiments, in a calibration mode, when the calibration enable signal is enabled and a calibration pulse or signal is also at the input of the AND gate, the calibration pulse or signal will be propagated through the AND gate to the OR gate 34. The calibration pulse or signal will then be output, in inverted form by the inverter 36.

In some embodiments, even in a calibration mode, the output of the respective SPAD is provided to the OR gate. This may mean that for example ambient conditions can be taken into account in the calibration mode.

However, it should be appreciated that in alternative embodiments, further or alternative logic may be provided so that the SPAD input is only provided to the OR gate 34 in a normal mode of operation.

It should be appreciated that the components of the selection logic 37 are by way of example. In other embodiments, one or more different gates may alternatively or additionally be used.

Figure 14:
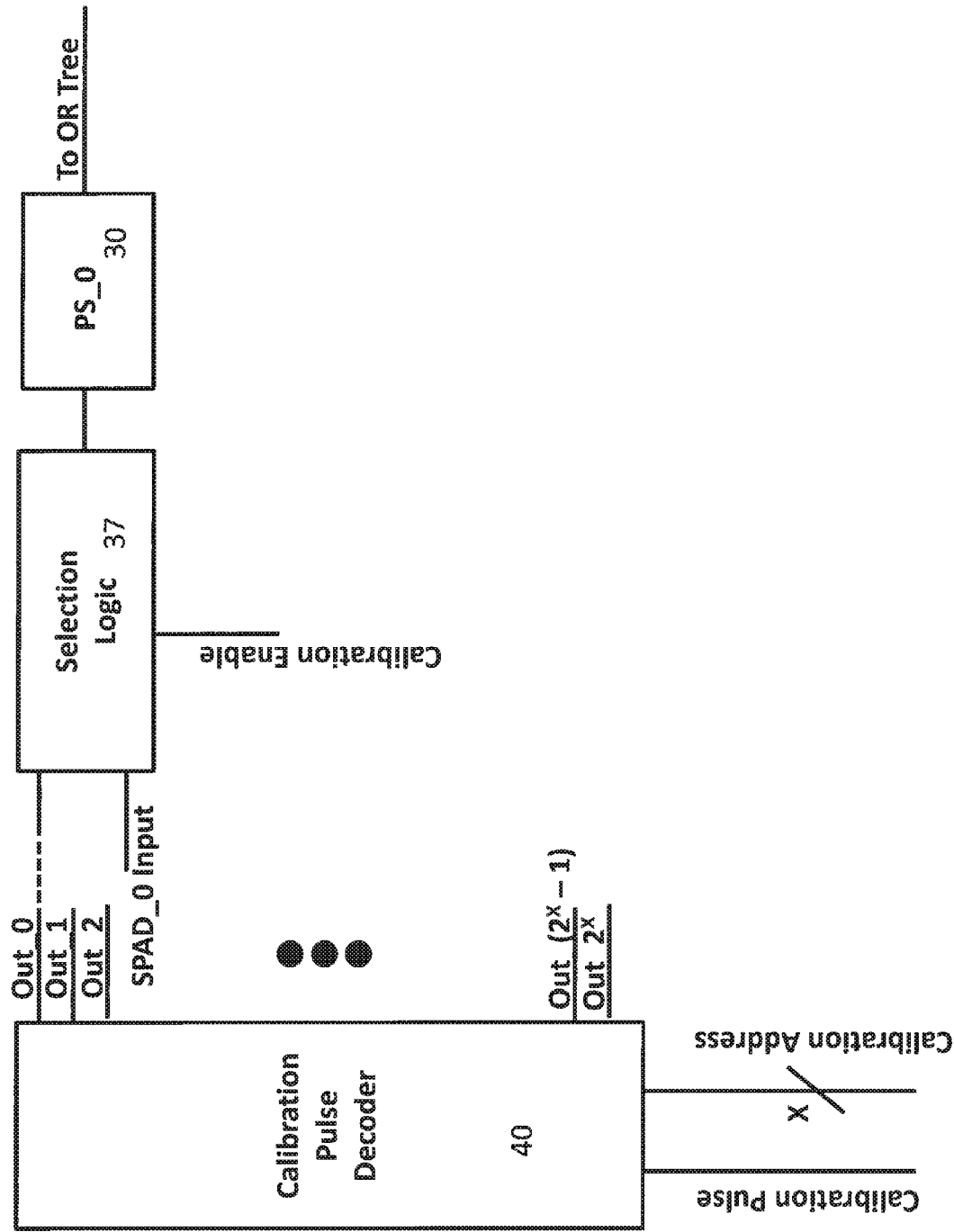

Reference is made to FIG. 14 which schematically shows the control of the calibration pulse or signal. The selection logic 37 is shown and is configured to provide an output to a respective pulse shaping circuitry 30. The selection logic receives the calibration enable signal as mentioned previously as well as a respective SPAD output signal.

Calibration pulse decoder 40 is configured to generate the calibration pulse which for example is provided to the input of the AND gate 32. The calibration pulse decoder 40 is configured to receive a calibration pulse along with a respective calibration address. The calibration address defines to which of the selection logic blocks the calibration pulse input is to be provided in a given cycle. A respective selection logic block 37 is provided for each SPAD. The calibration address will control to which of the selection logic blocks the calibration signal is applied. The calibration may be provided to one selection logic block at a time.

It should be appreciated that the arrangement of FIG. 14 may alternatively be used with the multiplexer arrangement of FIG. 12.

In some embodiments, a subset of the SPADs of an array is used for example for ranging measurements. As such, only the pulse selection logic or multiplexers associated with those SPADs may receive the calibration signals in some embodiments.

In those embodiments where only a subset of the SPADs is used, only those SPADs may be associated with respective selection logic. Alternatively all of the SPADs may be associated with respective selection logic.

In those embodiments which have both the SPAD measuring array and the SPAD reference array, the calibration is configured to provide corresponding signals to corresponding selection logic in the two arrays at the same time. Care may be taken to ensure that path lengths from the calibration decoder or similar logic to the respective selection logic blocks in the measuring and reference arrays are generally the same. In some embodiments, the paths from the calibration signal source to the respective measuring and reference arrays may be matched.

In some embodiments, only a single SPAD array may be used. For example, the reference array may be omitted in some embodiments.

The corresponding calibration paths are propagated from the reference array side and the measuring array side through the respective DLLs to the comparator. The resulting value or output may be used as an offset or correction value when the arrays are in a normal mode.

Figure 15:
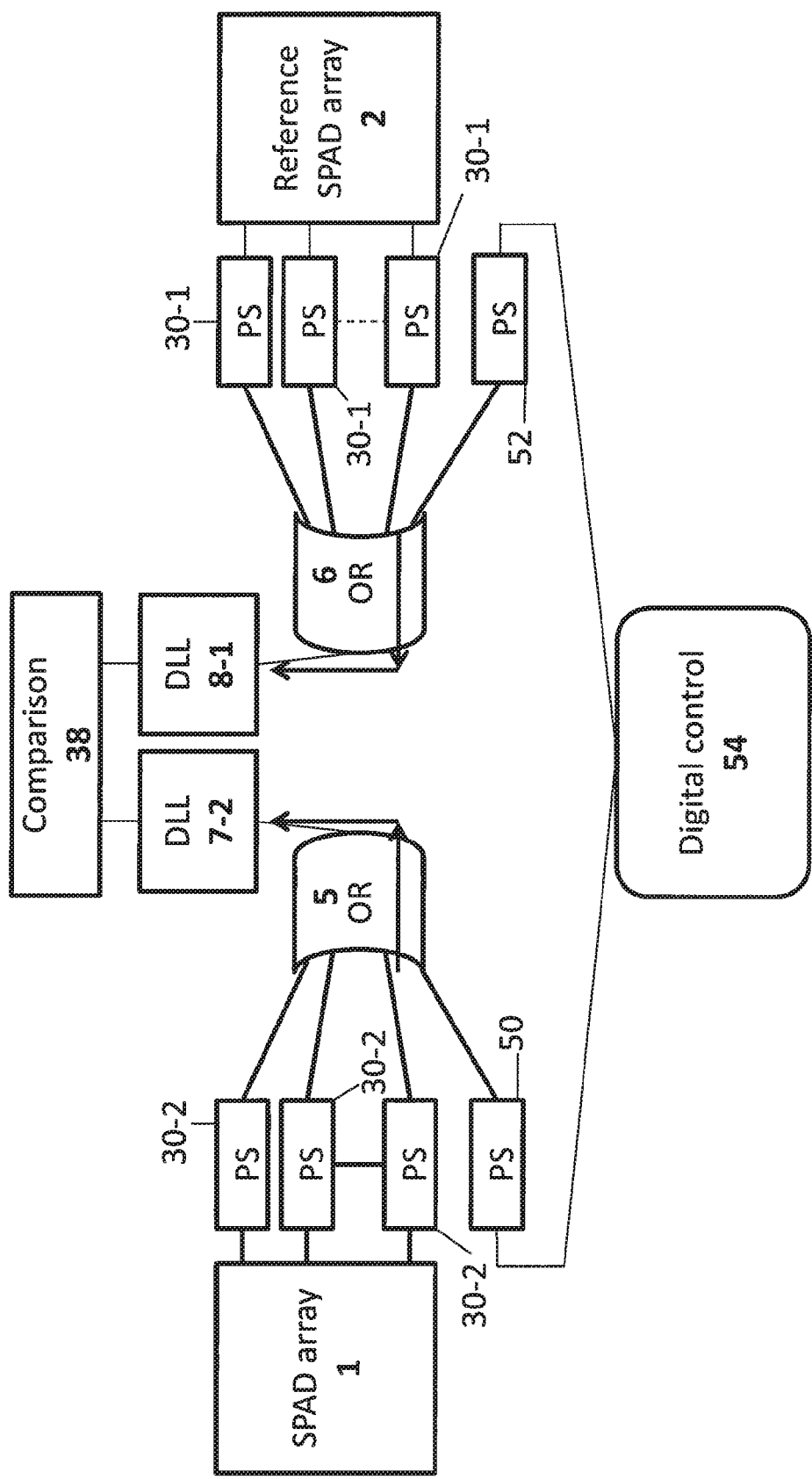
FIG. 15 shows another calibration arrangement.

Reference is made to FIG. 15 which shows an alternative calibration array which may be used in some embodiments. In this arrangement, a respective reference pulse shaping circuitry 50 and 52 is provided for each of the arrays. The calibration signal provided by a digital controller 54 or the like is provided to both reference pulse shaping circuitry, the outputs of which may be used as described previously.

It should be appreciated that the DLL arrangement shown is by way of example and can be replaced by any other suitable DLL arrangement.

It should be appreciated that the one or more DLLs may be replaced by any other suitable circuitry for providing a measure such as a count rate. For example a counter based architecture or a sigma delta converter may be used in some embodiments.

Figure 16:
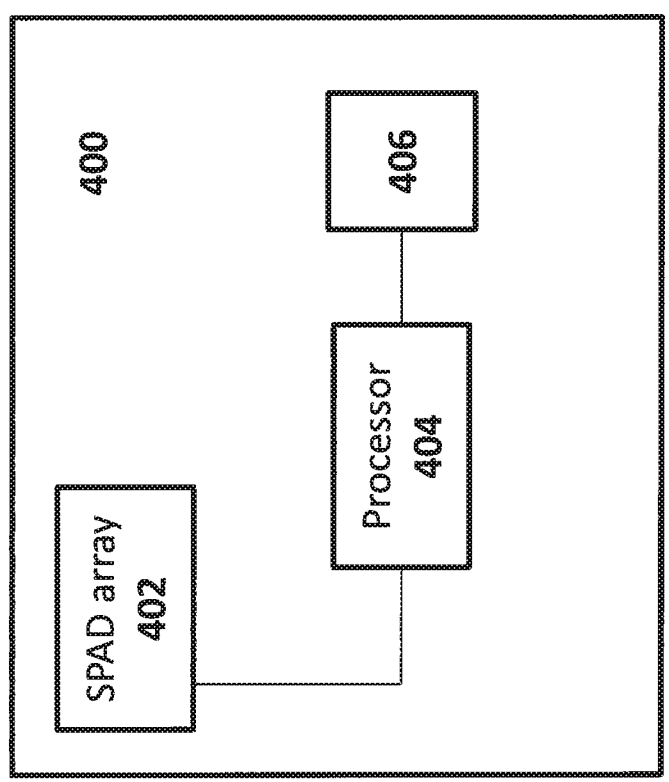
FIG. 16 shows a device with a SPAD array arrangement.

Some embodiments may be provided in a device 400 such as shown in FIG. 16. The device 400 may comprise any one of the SPAD or the like arrangements as previously described and referenced 402. An output from the SPAD arrangement may be provided to a processor 404. Based on the output provided by the processor an information or control signal may be output to function block 406. The function block may be a controller which is configured to cause one or more actions in response to detecting a presence of an object. The function block may be a display which is configured to display a measurement result.

It should be appreciated that the device may be any suitable device. By way of example only and without limitation, that device may be a mobile telephone, smart phone, tablet, computer, measuring device, switch controller such as for a light, controlling a water supply such as in a tap or toilet, door controller, distance sensor, impact controller, or any other suitable device.

Some embodiments may use other sensors, instead of SPADs. These sensors may be integrating elements generating events on reception of the light information.

It should be appreciated that the above described arrangements may be implemented at least partially by an integrated circuit, a chip set, one or more dies packaged together or in different packages, discrete circuitry or any combination of these options.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

What is claimed is:

1. An apparatus, comprising:
    an array of photon sensitive devices, said array configured to provide a plurality of input pulses in response to light detection;
    a calibration circuit configured to generate a calibration signal; and
    a plurality of circuits, each circuit configured to operate in at least a normal mode of operation and a calibration mode of operation, and wherein the circuit in the normal mode of operation is configured to generate an output pulse having a beginning which coincides with a beginning of the input pulse from a respective photon sensitive device of said array, and wherein the circuit in the calibration mode of operation is configured to generate the output pulse having a beginning which coincides with a beginning of a calibration pulse of the calibration signal.

2. The apparatus as claimed in claim 1, wherein in said calibration mode, said calibration signal is applied to one circuit at a time.

3. The apparatus as claimed in claim 1, wherein each circuit comprises a selection logic circuit configured to have a first input coupled to a respective output of the photon sensitive device within said array and a second input configured to receive said calibration signal.

4. The apparatus as claimed in claim 3, wherein each selection logic circuit comprises a control input configured to receive a control signal which in use controls the selection logic circuit to output the input pulse in said normal mode of operation and output said calibration pulse in said calibration mode of operation.

5. The apparatus as claimed in claim 3, wherein each circuit further comprises a pulse shaping circuit, and wherein an output of each selection logic circuit is coupled to an input of a respective one of the pulse shaping circuits.

6. The apparatus as claimed in claim 5, further comprising a logic arrangement coupled to a respective output of each of said pulse shaping circuits.

7. The apparatus as claimed in claim 6, wherein said logic arrangement comprises an OR tree.

8. The apparatus as claimed in claim 1, wherein said photon sensitive devices comprise single photon avalanche diodes.

9. The apparatus as claimed in claim 1, wherein the calibration circuit comprises a calibration signal source configured to output a plurality of calibration signals for respective pulse processing circuits.

10. The apparatus as claimed in claim 9, wherein said calibration signal source is configured to output said calibration signals at different times.

11. The apparatus as claimed in claim 1, wherein said array of photon sensitive devices comprises a first and second arrays of photon sensitive devices and wherein said plurality of circuits comprises first and second pluralities of circuits, the first array of photon sensitive devices and first plurality of circuits forming a first circuit arrangement, and the second array of photon sensitive devices and second plurality of circuits forming a second circuit arrangement.

12. The apparatus as claimed in claim 11, wherein the first array of photon sensitive devices of said first circuit arrangement comprises a reference array and the second array of photon sensitive devices of said second circuit arrangement comprises a measuring array.

13. The apparatus as claimed in claim 12, wherein the calibration circuit comprises a calibration signal source configured to output a plurality of calibration signals for respective circuits of said first circuit arrangement and said second circuit arrangement.

14. The apparatus as claimed in claim 13, wherein a path from said calibration signal source to said first circuit arrangement is matched with a path from said calibration signal source to said second circuit arrangement.

15. The apparatus of claim 1 wherein the apparatus is formed as an integrated circuit.

16. The apparatus of claim 1 wherein the apparatus is a component of a device.

17. An apparatus, comprising:
a photon sensitive device having an output configured to generate a photon pulse in response to receipt of a photon;
a calibration signal generator having a first output configured to generate a calibration pulse and a second output configured to generate a control signal;
a pulse shaping circuit configured to generate an output pulse signal having a leading edge which coincides with a leading edge of a received input pulse signal; and
a multiplexing circuit having a first input coupled to the output of the photon sensitive device and configured to receive the photon pulse and a second input coupled to the first output of the calibration signal generator and configured to receive the calibration pulse and a control input coupled to the second output of the calibration signal generator and configured to receive the control signal;
wherein said multiplexing circuit couples the photon pulse as the input pulse signal to the pulse shaping circuit when the control signal is set in a normal operating state; and
wherein said multiplexing circuit couples the calibration pulse as the input pulse signal to the pulse shaping circuit when the control signal is set in a calibration mode of operation.

18. An apparatus, comprising:
a photon sensitive device having an output configured to generate a photon pulse in response to receipt of a photon;
a calibration signal generator having a first output configured to generate a calibration pulse and a second output configured to generate a control signal;
a pulse shaping circuit configured to generate an output pulse signal having a leading edge which coincides with a leading edge of a received input pulse signal; and
a logic circuit having a first input coupled to the output of the photon sensitive device and configured to receive the photon pulse and a second input coupled to the first output of the calibration signal generator and configured to receive the calibration pulse and a control input coupled to the second output of the calibration signal generator and configured to receive the control signal;
wherein said logic circuit passes the photon pulse as the input pulse signal to the pulse shaping circuit when the control signal is set in a normal operating state; and
wherein said logic circuit passes the calibration pulse as the input pulse signal to the pulse shaping circuit when the control signal is set in a calibration mode of operation.

19. An apparatus, comprising:
a photon sensitive device having an output configured to generate a photon pulse in response to receipt of a photon;
a calibration signal generator having a first output configured to generate a calibration pulse and a second output configured to generate a control signal; and
a multiplexing circuit having a first input coupled to the output of the photon sensitive device and configured to receive the photon pulse and a second input coupled to the first output of the calibration signal generator and configured to receive the calibration pulse and a control input coupled to the second output of the calibration signal generator and configured to receive the control signal;
wherein said multiplexing circuit passes the photon pulse through for output as an output pulse when the control signal is set in a normal operating state; and
wherein said multiplexing circuit passes the calibration pulse through for output as the output pulse when the control signal is set in a calibration mode of operation.

20. The apparatus of claim 19, further comprising a circuit having an input configured to receive the output pulse, said circuit operating to generate pulse signal having a leading edge corresponding to a leading edge of the output pulse and having a pulse length shorter than a pulse length of the output pulse.

21. An apparatus, comprising:
a photon sensitive device configured to provide an input pulse in response to light detection;
a calibration circuit configured to generate a calibration signal; and
a pulse processing circuit having an input to receive the light pulse and an input to receive the calibration signal, said pulse processing circuit configured to operate in a normal mode of operation to generate an output pulse in response to said input pulse but having a shorter pulse length than said input pulse and further configured to operate in a calibration mode of operation to generate said output pulse in response to a calibration pulse of said calibration signal but having a shorter pulse length than said calibration pulse.

22. The apparatus of claim 21, wherein the pulse processing circuit comprises a selection logic circuit configured to have a first input coupled to an output of the photon sensitive device and a second input configured to receive said calibration signal.

23. The apparatus of claim 22, wherein the selection logic circuit further comprises a control input configured to receive a control signal from said calibration circuit, the control signal configured to control operation of the selection logic circuit to output the input pulse in said normal mode of operation and output said calibration pulse in said calibration mode of operation.

24. The apparatus as claimed in claim 22, wherein each pulse processing circuit further comprises a pulse shortening circuit having an input coupled to an output of the selection logic circuit.

25. The apparatus of claim 21, wherein said photon sensitive device comprises a single photon avalanche diode.

26. The apparatus of claim 21, wherein the apparatus is formed as an integrated circuit.

27. The apparatus of claim 21, wherein the apparatus is a component of a device.

* * * * *